(12) United States Patent
Leong et al.

(10) Patent No.: US 11,218,050 B2
(45) Date of Patent: Jan. 4, 2022

(54) MOTOR STATOR BACK-IRON COOLING THROUGH INTERNAL CHANNELS

(71) Applicant: GM GLOBAL TECHNOLOGY OPERATIONS LLC, Detroit, MI (US)

(72) Inventors: Yew Sum Leong, Northville, MI (US); Srihari K. Gangaraj, Troy, MI (US); Paramesh Chintala, Rochester Hills, MI (US); Scott Vaubel, Attica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 16/434,163

(22) Filed: Jun. 6, 2019

(65) Prior Publication Data

US 2020/0389064 A1    Dec. 10, 2020

(51) Int. Cl.
| | |
|---|---|
| *H02K 5/20* | (2006.01) |
| *H02K 9/19* | (2006.01) |
| *H02K 1/20* | (2006.01) |
| *H02K 1/16* | (2006.01) |
| *H02K 1/18* | (2006.01) |

(52) U.S. Cl.
CPC ............... *H02K 5/20* (2013.01); *H02K 1/16* (2013.01); *H02K 1/20* (2013.01); *H02K 9/19* (2013.01); *H02K 1/182* (2013.01)

(58) Field of Classification Search
CPC .. H02K 5/20; H02K 9/19; H02K 1/20; H02K 1/16; H02K 1/182
See application file for complete search history.

(56) References Cited

U.S. PATENT DOCUMENTS

2019/0348889 A1* 11/2019 Liu .................... B60L 1/003

\* cited by examiner

*Primary Examiner* — Tulsidas G Patel
*Assistant Examiner* — Riley Owen Stout
(74) *Attorney, Agent, or Firm* — Harness, Dickey & Pierce, P.L.C.

(57) ABSTRACT

A motor stator includes a plurality of stacked annular stator laminates defining a stator core having a plurality of stator teeth on an inner diameter thereof, at least some of the plurality of stator laminates including a plurality of coolant openings therethrough. The plurality of coolant openings of adjacent stator laminates communicate with one another in order to define cooling channels inside the stator core. At least some of the plurality of stator laminates include the plurality of coolant openings including a plurality of generally circumferentially extending slots.

13 Claims, 7 Drawing Sheets

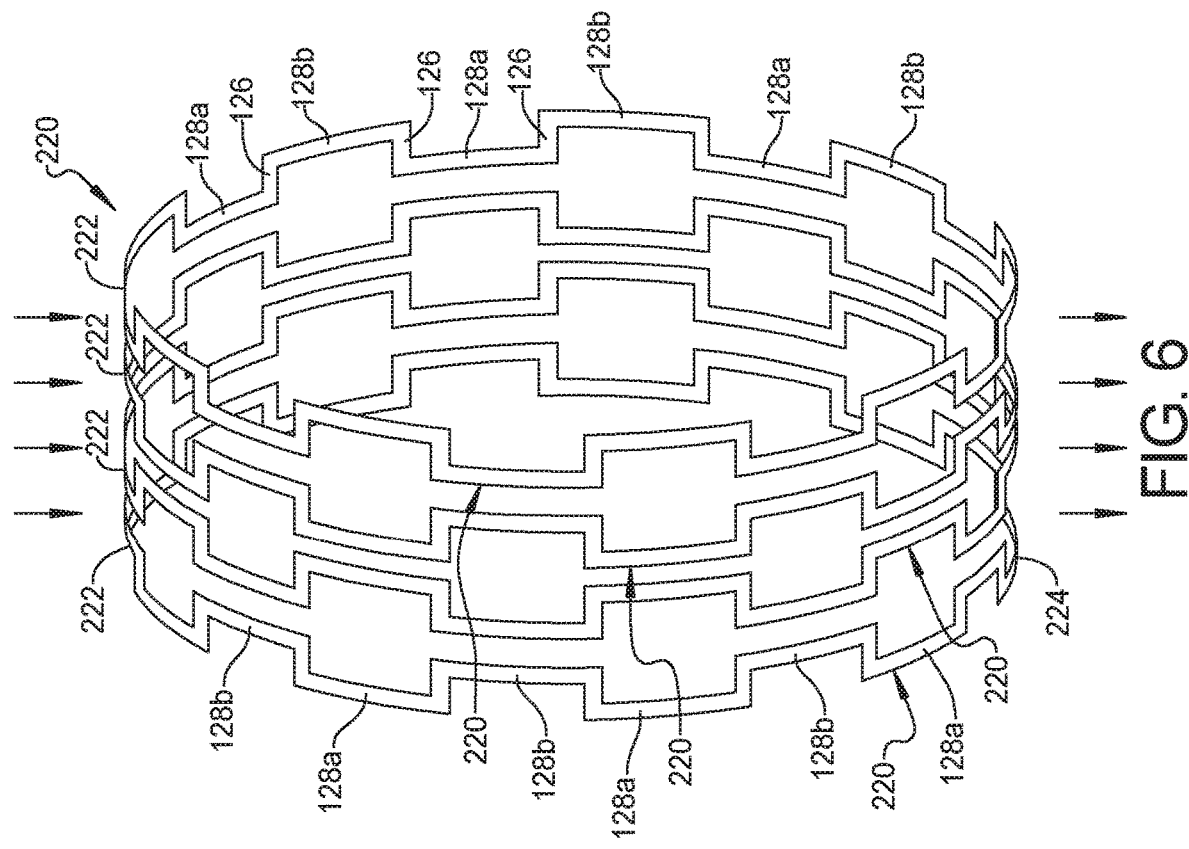
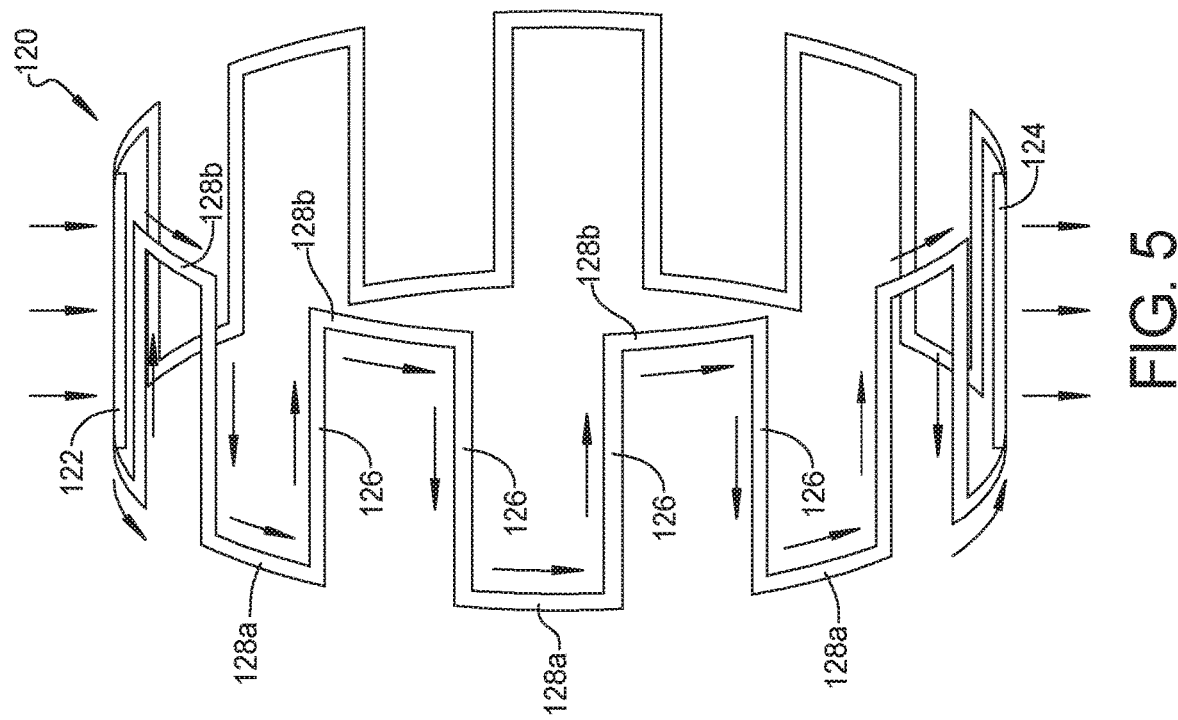

MOTOR STATOR BACK-IRON COOLING THROUGH INTERNAL CHANNELS

FIELD

The present disclosure relates to a motor stator back-iron cooling through internal channels.

BACKGROUND

This section provides background information related to the present disclosure which is not necessarily prior art.

Electric motors are commonly used in vehicle propulsion systems and in other industrial applications. Existing electric motors include poor cooling characteristics of the windings and the stator core. Overheating of the stator can decrease the efficiency of the electric motor and can degrade the motor's performance.

SUMMARY

This section provides a general summary of the disclosure, and is not a comprehensive disclosure of its full scope or all of its features.

In order to efficiently cool the motor stator, the present disclosure provides a motor stator that includes a plurality of stacked annular stator laminates defining a stator core having a plurality of stator teeth on an inner diameter thereof, at least some of the plurality of stator laminates including a plurality of coolant openings therethrough. The plurality of coolant openings of adjacent stator laminates communicate with one another in order to define cooling channels inside the stator core. At least some of the plurality of stator laminates include the plurality of coolant openings including a plurality of generally circumferentially extending slots.

According to a further aspect a method of making a motor stator according to the principles of the present disclosure includes stamping a plurality of annular stator laminates including a plurality of stator teeth on an inner diameter thereof and a plurality of coolant openings therethrough, stacking the plurality of annular stator laminates to define a stator core, wherein the plurality of coolant openings of adjacent stator laminates communicate with one another in order to define cooling channels inside the stator core and wherein at least some of the plurality of stator laminates include the plurality of coolant openings including a plurality of circumferentially extending slots.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a schematic view of an alternative exemplary cooling channel configuration according to the principles of the present disclosure;

FIG. 6 is a schematic view of a further alternative exemplary cooling channel configuration according to the principles of the present disclosure;

Corresponding reference numerals indicate corresponding parts throughout the several views of the drawings.

DETAILED DESCRIPTION

Figure 1:
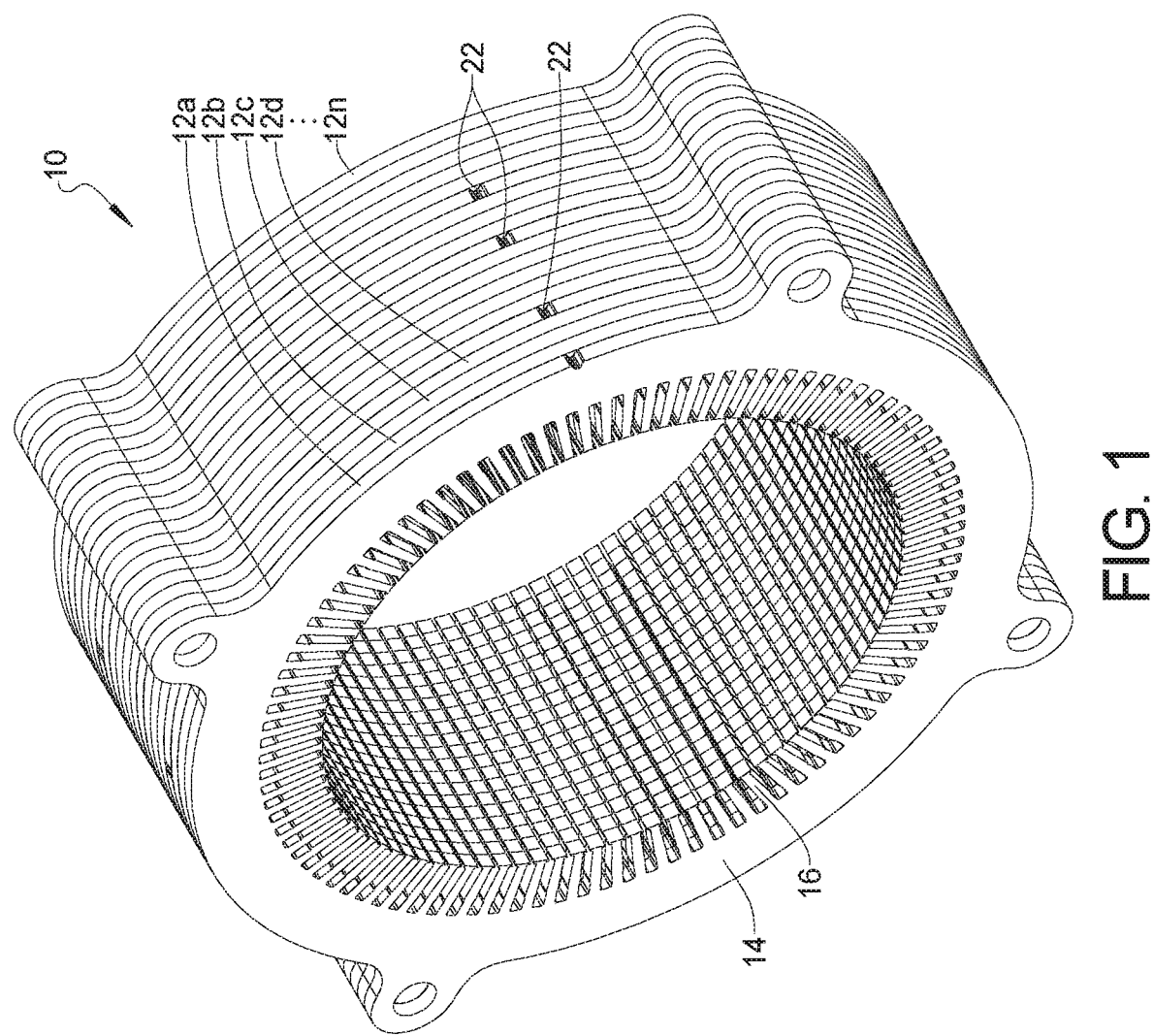
FIG. 1 is a perspective view, drawn to scale, of an oil cooled stator core according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
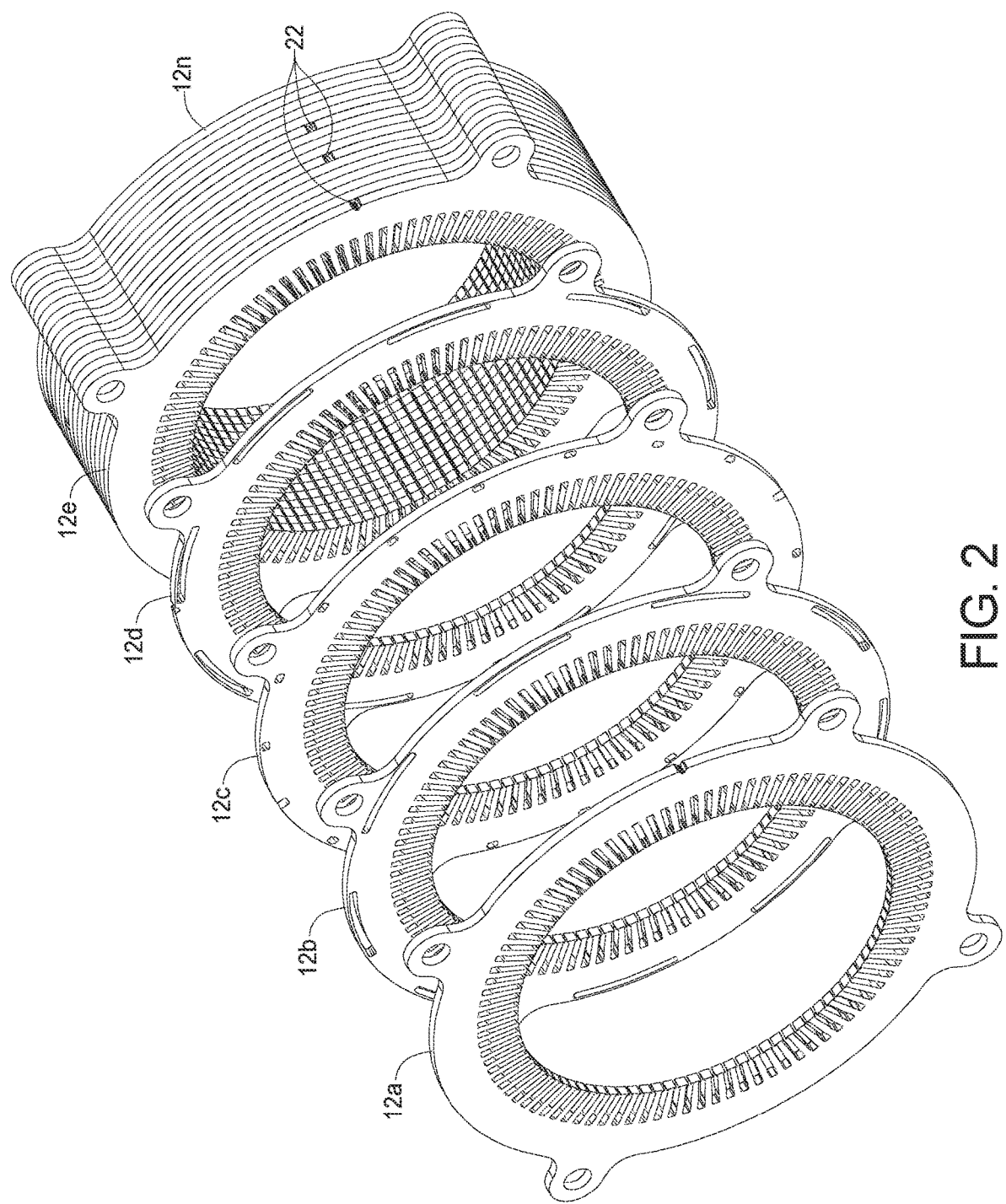
FIG. 2 is a partially exploded perspective view, drawn to scale, of the oil cooled stator core shown in FIG. 1.
Figure 3:
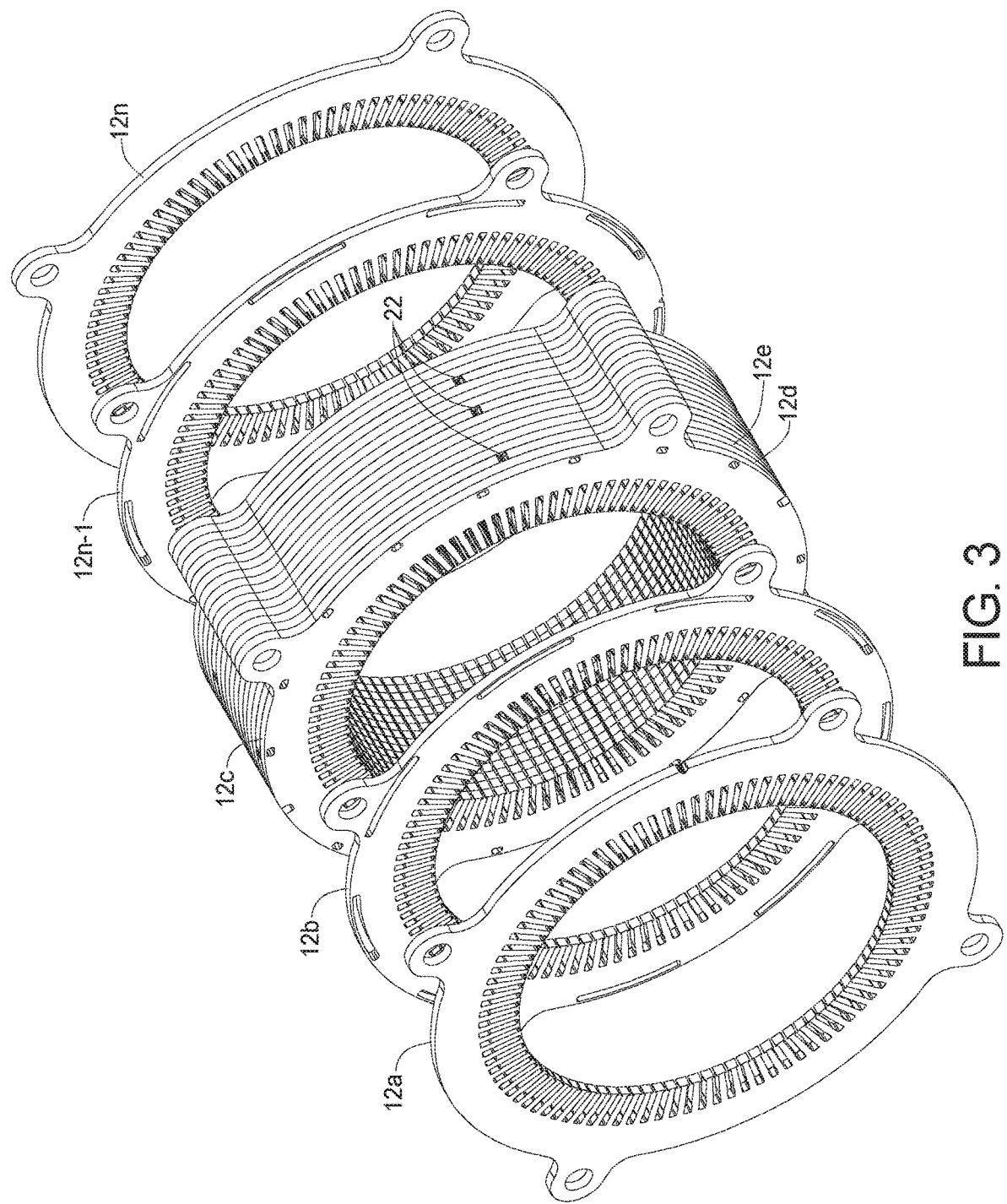
FIG. 3 is a further partially exploded perspective view, drawn to scale, of the oil cooled stator core shown in FIG. 1.

With reference to FIGS. 1-3, a stator core 10 according to the principles of present disclosure is shown. The stator core 10 is made up of a plurality of groupings 12a, 12b, 12c, 12d . . . 12n of stamped laminates formed from sheet steel. In particular, each grouping 12a, 12b, 12c, 12d . . . 12n of stamped laminates can include a predetermined number of stamped laminates in order to provide a desired thickness to the grouping 12a, 12b, 12c, 12d . . . 12n. Without being limited by the particular example, each of the stamped laminates can be between 0.2 and 0.5 mm thick. Accordingly, in a grouping of, for example, ten (10) stamped laminates, the groupings12a, 12b, 12c, 12d . . . 12n can have a thickness of between 2 and 5 mm dependent upon the thickness of the laminates used. In the example shown, twenty (20) groupings of laminates are shown so that, for example, with 10 laminates in each grouping 12a, 12b, 12c, 12d . . . 12n the stator core 10 would include 200 laminates. It should be understood that because the individual laminates making up each grouping are very thin, for illustrative purposes, the individual laminates of each grouping 12a, 12b, 12c, 12d . . . 12n are not individually shown. The stator core 10 includes all of the individual laminates of each grouping 12a, 12b, 12c, 12d . . . 12n being secured together in the stacked arrangement as illustrated in FIG. 1. The individual laminates can be secured together by adhesive bonding, welding, clamping, or other techniques.

Figure 4:
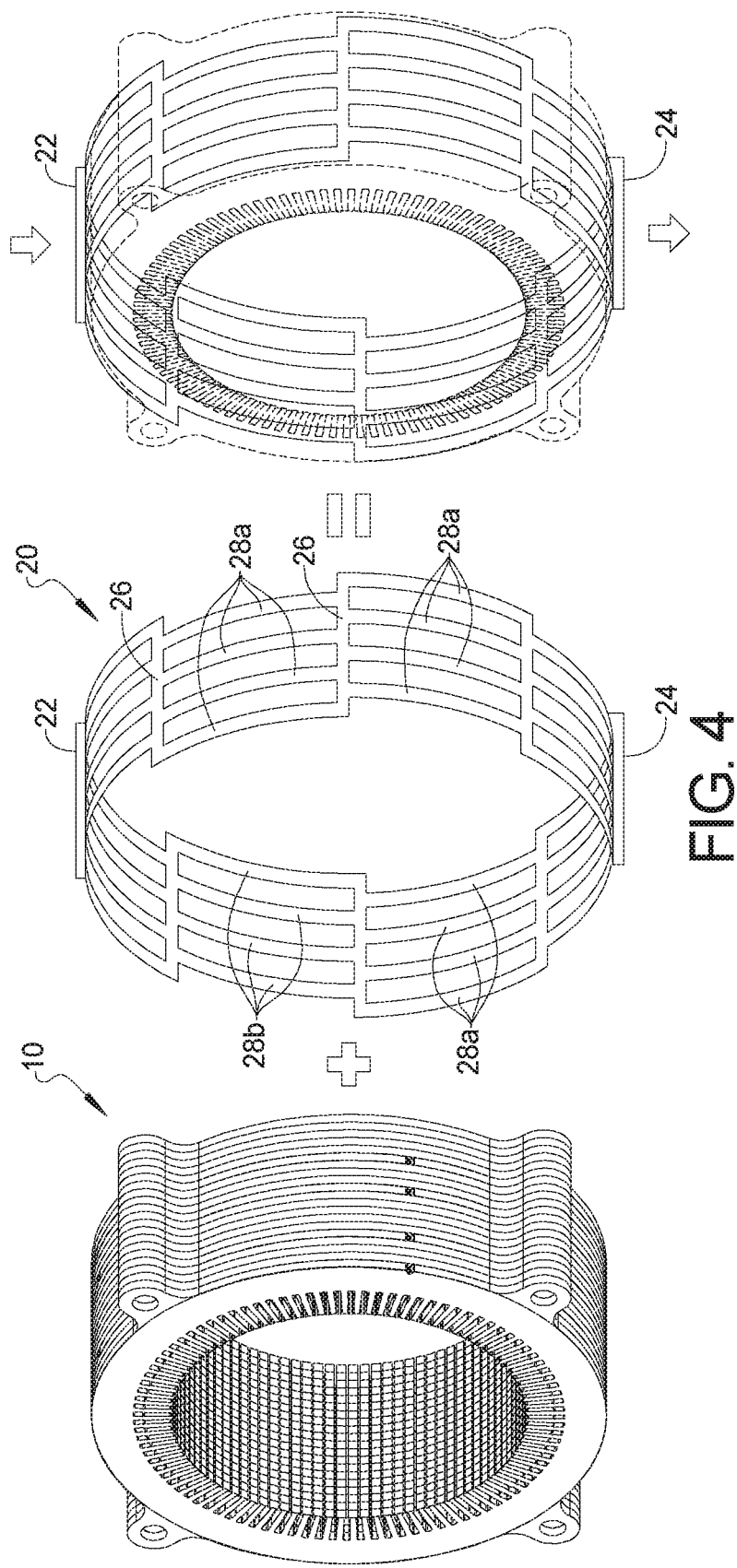
FIG. 4 is a schematic view of an exemplary cooling channel configuration according to the principles of the present disclosure.

The stator core 10 includes a back-iron portion 14 along its outer diameter and a plurality of stator teeth 16 along its inner diameter. The different groupings of laminates 12a, 12b, 12c, 12d . . . 12n are specifically designed to define cooling channels within the back-iron of the stator core 10. With reference to FIG. 4, a schematic view of exemplary cooling channels 20 that can be formed within the back-iron portion 14 of the stator core 10 are shown. As shown in FIG. 4, the cooling channels 20 are schematically shown with the stator core 10 in phantom, wherein the cooling channels 20 extend generally circumferentially around the entire stator core 10 and include an inlet opening 22 at a top of the stator core 10 and an outlet opening 24 at a bottom of the stator core 10. The inlet and outlet openings 22, 24 can be formed in select ones of the groupings of laminates 12a, 12b, 12c, 12d . . . 12n as shown in FIGS. 1-3 or in all of the groupings of laminates as depicted in FIGS. 4-6. It should also be understood that alternative inlet and outlet openings can be utilized. In particular, the inlet and outlet openings can be formed by an axial opening through the groupings of laminates 12a, 12b, 12c, 12d . . . 12n.

The cooling channels 20 can optionally include a plurality of axial channel segments 26 and a plurality of circumferential channel segments 28a, 28b that extend generally circumferentially of a center axis of the stator core 10. By "generally circumferentially," it is meant that the channel segments and slots can extend in a circumferential direction without requiring that the segments being disposed completely along a circumferential arc. By way of example, the circumferential channel segments 28a, 28b can be formed by straight, curved, or crooked channel segments that extend in a generally circumferential direction. The plurality of circumferential channel segments 28a can be axially offset from the plurality of circumferential channel segments 28b and they can be fluidly connected by the axial channel segments 26. The number of parallel circumferential channel segments 28a, 28b can be dependent upon the number of groupings of laminates 12a, 12b, 12c, 12d . . . 12n as well as the desired cooling that is needed for the motor stator. Accordingly, the cooling channels 20 define a cooling fluid path that extends circumferentially through the stator core 10 with interconnected circumferential channel segments 28a, 28b. The inlet opening 22 at the top of the stator core 10 and the outlet opening 24 at the bottom of the stator core 10 creates a gravity flow of the cooling oil through the stator core 10 without requiring further pressurization.

The cooling channels can take on other forms as illustrated in FIGS. 5 and 6. As shown in FIG. 5, a single serpentine cooling channel 120 is formed that extends circumferentially through the back-iron 114 of the stator core 110. The cooling channel 120 has an inlet opening 122 at a top of the stator core 110 and an outlet opening 124 at a bottom of the stator core 110. The serpentine cooling channel 120 includes a plurality of axial channel segments 126 and a plurality of circumferential channel segments 128a, 128b that extend generally circumferentially of a center axis of the stator core 110. The plurality of circumferential channel segments 128a can be axially offset and circumferentially offset from the plurality of circumferential channel segments 128b and they are fluidly connected by the axial channel segments 126 in order to define a continuous serpentine cooling channel 120.

As shown in FIG. 6, a plurality of separate serpentine cooling channels 220 are formed that extends circumferentially through the back-iron 214 of the stator core 210. The cooling channels 220 has an inlet opening 222 at a top of the stator core 210 and an outlet opening 224 at a bottom of the stator core 210. Each of the serpentine cooling channels 220 includes a plurality of axial channel segments 226 and a plurality of circumferential channel segments 228a, 228b that extend generally circumferentially of a center axis of the stator core 210. The plurality of circumferential channel segments 228a can be axially offset and circumferentially offset from the plurality of circumferential channel segments 228b and they are fluidly connected by the axial channel segments 226 in order to define each of the continuous serpentine cooling channels 220.

Referring now to FIG. 2, the laminate grouping 12b is shown including a plurality of generally circumferentially extending slots 30a extending through each laminate in the grouping 12b. The generally circumferentially extending slots 30a correspond with the plurality of circumferential channel segments 28a of the cooling channels 20 shown in FIG. 4 and are intended to have a larger dimension in the circumferential direction than in a radial direction. The laminate grouping 12c is shown including a plurality of openings 32. The openings 32 are aligned with opposite ends of the generally circumferentially extending slots 30a and define portions of the axial channel segments 26 of the cooling channels 20 shown in FIG. 4. Although the openings 32 can have various shapes, they are particularly designed to provide the axial channel segments 26 of the cooling channels. The laminate grouping 12d is shown including a plurality of generally circumferentially extending slots 30b extending through each laminate in the grouping 12d. The generally circumferentially extending slots 30b are circumferentially offset from the generally circumferentially extending slots 30a of the laminate grouping 12b and correspond with the plurality of circumferential channel segments 28b of the cooling channels 20 shown in FIG. 4. The laminate grouping 12e is the same as laminate grouping 12c and includes openings 32 that also define portions of the axial channel segments 26 of the cooling channels 20. Accordingly, by repeating the layering of the laminate groupings 12b, 12c, 12d, 12e creates the cooling channel arrangement of FIG. 4. It should be recognized that by incorporating the laminate groupings12b, 12c, 12d, 12e in different ways, the cooling channels 120 and 220 as shown in FIGS. 5 and 6 can also be easily constructed, as well as other modified shapes. In particular, the laminate groupings 12b, 12d can be used to form the circumferential channel segments 128a, 228a; 128b, 228b, respectively and the laminate grouping 12c can be used to form portions of the axial channel segments 126, 226. As shown in FIGS. 1-4, the end laminate groupings 12a, 12n can be formed without the generally circumferentially extending slots 30a or the openings 32 as utilized in the laminate groupings12b, 12c, 12d in order to close off the ends of the cooling channels20, 120, 220. However, it should be understood that the end laminate groupings 12a, 12n can be eliminated or provided with other desired openings to allow a desired leak out of the cooling oil over the coils of the stator.

Figure 7:
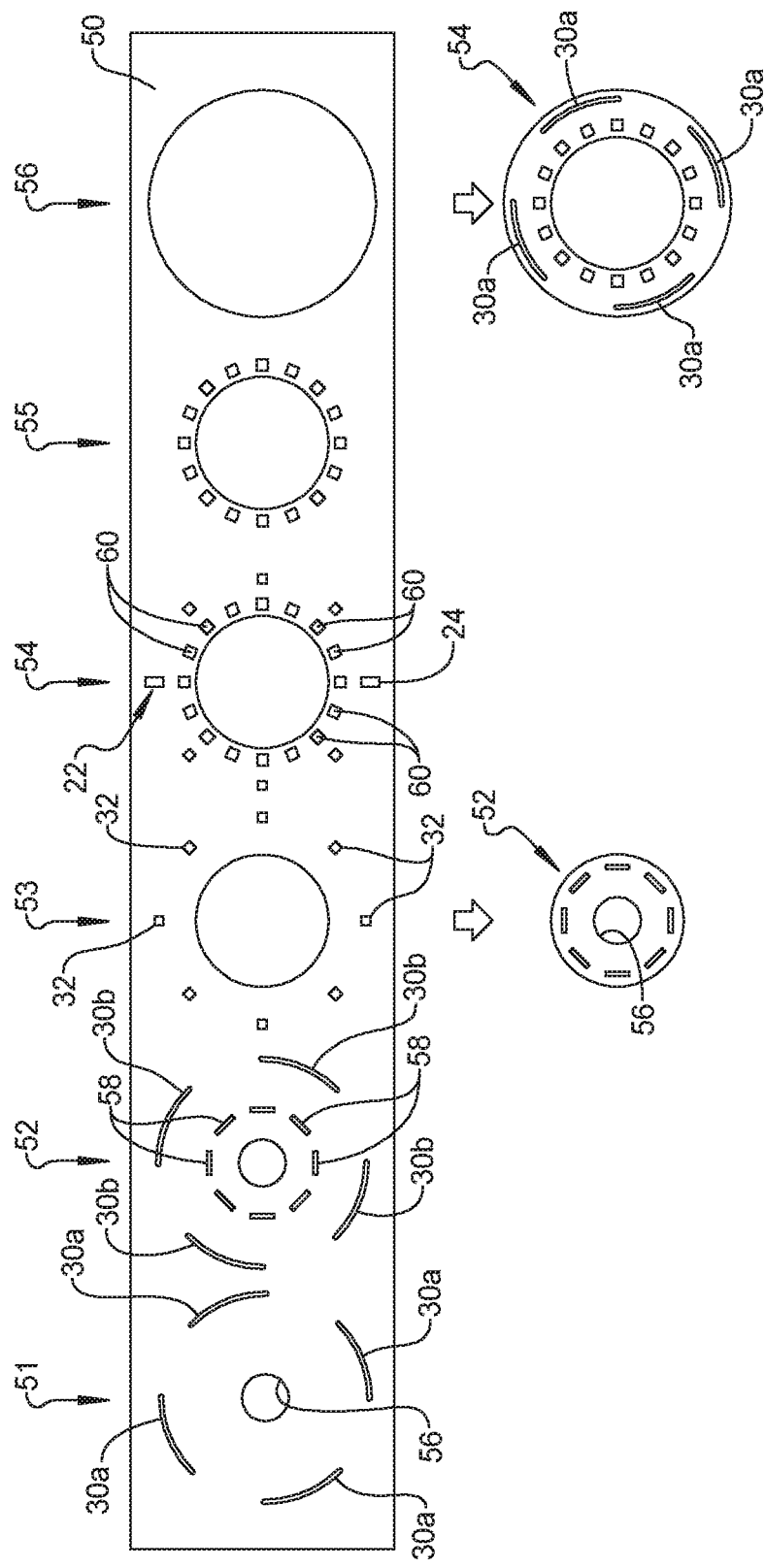
FIG. 7 is a schematic view of an exemplary stamping sequence for making the stator laminates according to the principles of the present disclosure.

With reference to FIG. 7, an exemplary laminate stamping process used for making laminates similar to the laminates used in the laminate groupings 12b will be described. As shown in FIG. 7, a portion of a continuous roll of sheet steel 50 is shown, wherein both rotor laminates 52 and the stator laminates 54 can be punched. The stamping process can utilize various stamping stages that can be turned on or turned off depending upon desired configuration of the laminate being stamped. As shown at stage S1 a plurality of circumferential slots 30a can be formed when the punch stage S1 is activated to form laminates for the laminate grouping 12b. In addition to the optional punching for the circumferential slots 30a, stage S1 can include punching the inner diameter hole 56 for the rotor laminate 53.

Stage S2 shows the optional punching of circumferential slots 30b that can be activated to form laminates for the laminate grouping 12d. In addition to the optional punching for the circumferential slots 30b, stage S2 can include punching the circumferential slots 58 for the rotor laminate 52.

Stage S3 shows the optional punching of openings 32 that can be activated to form laminates for the laminate grouping 12c. In addition to the optional punching for the openings 32, stage S3 can include punching the rotor laminate 52 from the metal sheet 50.

Stage S4 shows the optional punching of the inlet and outlet openings 22, 24 that can be activated to form inlet and outlet openings in any of the desired laminate grouping 12b, 12c, 12d. In addition to the optional punching for the inlet and outlet openings 22, 24, stage S4 can also include punching the holes 60 for forming the stator teeth.

Stage S5 shows punching the inner diameter edge of the stator laminates 54 in order to complete the forming of the stator teeth. Stage S6 shows punching the outer diameter edge of the stator laminates 54 in order to complete the forming of the stator laminates 54. It should be understood that the stator laminate 54 shown in FIG. 7 includes the circumferential slots 30a from stage 1 while the remaining optional portions of stages S2-S4 are deactivated so that the circumferential slots 30b, openings 32 and inlet and outlet openings 22, 24 are not provided in the exemplary stator laminate 54, as shown. By activating different ones of the optional punching stages, the different types of stator laminates can be formed in a continuous manufacturing process.

Figure 8:
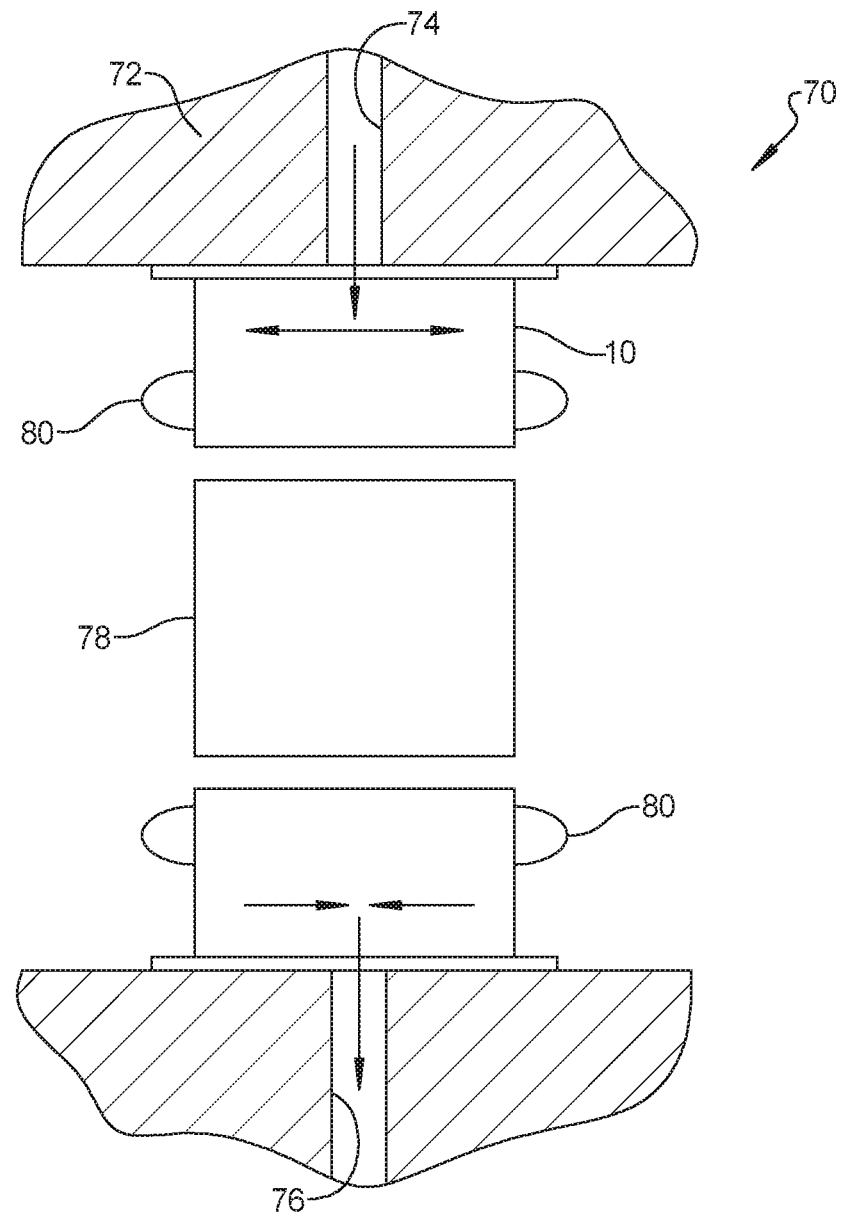
FIG. 8 is a schematic view of a motor having an oil cooled stator according to the principles of the present disclosure.

As noted above, the stator laminates 54 are provided in groupings and are all secured together in a stack that defines the stator core 10. As shown in FIG. 8, the stator core 10 is shown implemented in a motor 70 having a housing 72 including an oil port 74 in communication with the oil inlet opening 22 and an oil port 76 for receiving oil from the oil outlet opening 24. A rotor 78 is rotatable relative to the stator core 10. As is known in the art, the stator core 10 has a plurality of coil windings 80 disposed around the stator teeth 16.

The set of stator laminates with unique slot geometry in the back-iron section, when assembled, will create tangential axial cooling channels inside the stator core with openings at the top and bottom of the stator core outer diameter. The unique slot geometry can be incorporated into existing progressive die stages by turning the special punches on/off during stamping sequences so that a complete set of stator laminates can be consecutively produced in a desired order to completely form all of the stator laminates of a stator core. The cooling channels can be designed to consist of single path are multiple paths with interconnected and/or unconnected channels.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motor stator, comprising:
a plurality of stacked annular stator laminates defining a stator core having a plurality of stator teeth on an inner diameter thereof, at least some of the plurality of stator laminates including a plurality of coolant openings therethrough, wherein the plurality of coolant openings of adjacent stator laminates communicate with one another in order to define cooling channels inside the stator core, wherein at least some of the plurality of stator laminates include the plurality of coolant openings including a plurality of generally circumferentially extending slots having a first circumferential dimension and wherein others of the plurality of stator laminates include the plurality of coolant openings including only a plurality of axial openings that extend parallel to a center axis of the stator core and have a second circumferential dimension that is smaller than the first circumferential dimension, wherein the plurality of axial openings align only with an end of one of the plurality of generally circumferentially extending slots, wherein the plurality of generally circumferentially extending slots define circumferential channel segments that provide primarily circumferential coolant flow in the stator core and the plurality of axial openings define axial channel segments that provide primarily axial coolant flow between the circumferential channel segments in the stator core.

2. The motor stator according to claim 1, further comprising an inlet opening at a top of the stator core in communication with the cooling channels and an outlet opening at a bottom of the stator core in communication with the cooling channels.

3. The motor stator according to claim 1, wherein the plurality of circumferentially extending slots combine to define a plurality of parallel circumferential cooling channels extending completely around the stator core.

4. The motor stator according to claim 1, wherein the plurality of circumferentially extending slots combine to define at least one circumferential cooling channel extending completely around the stator core.

5. The motor stator according to claim 4, wherein the at least one circumferential cooling channel includes axially extending segments disposed between the plurality of circumferentially extending slots.

6. A motor, comprising:
a motor stator including a plurality of stacked annular stator laminates defining a stator core having a plurality of stator teeth on an inner diameter thereof, at least some of the plurality of stator laminates including a plurality of coolant openings therethrough, wherein the plurality of coolant openings of adjacent stator laminates communicate with one another in order to define cooling channels inside the stator core, wherein at least some of the plurality of stator laminates include the plurality of coolant openings including a plurality of circumferentially extending slots having a first circumferential dimension and wherein others of the plurality of stator laminates include the plurality of coolant openings including only a plurality of axial openings that extend parallel to a center axis of the stator core and have a second circumferential dimension that is smaller than the first circumferential dimension, wherein the plurality of axial openings align only with an end of one of the plurality of generally circumferentially extending slots, wherein the plurality of generally circumferentially extending slots define circumferential channel segments that provide primarily circumferential coolant flow in the stator core and the plurality of axial openings define axial channel segments that provide primarily axial coolant flow between the circumferential channel segments in the stator core; and
a motor rotor rotatably mounted relative to the motor stator.

7. The motor according to claim 6, further comprising an inlet opening at a top of the stator core in communication with the cooling channels and an outlet opening at a bottom of the stator core in communication with the cooling channels.

8. The motor according to claim 6, wherein the plurality of circumferentially extending slots combine to define a plurality of parallel circumferential cooling channels extending completely around the stator core.

9. The motor according to claim 6, wherein the plurality of circumferentially extending slots combine to define at least one circumferential cooling channel extending completely around the stator core.

10. The motor according to claim 6, wherein the plurality of circumferential channel segments combine to define a plurality of interconnected circumferential cooling channels extending completely around the stator core.

11. A method of making a motor stator, comprising:
stamping a plurality of annular stator laminates including a plurality of stator teeth on an inner diameter thereof and a plurality of coolant openings therethrough,
stacking the plurality of annular stator laminates to define a stator core, wherein the plurality of coolant openings of adjacent stator laminates communicate with one another in order to define cooling channels inside the stator core, wherein at least some of the plurality of stator laminates include the plurality of coolant openings including a plurality of circumferentially extending slots having a first circumferential dimension and wherein others of the plurality of stator laminates include the plurality of coolant openings including only a plurality of axial openings that extend parallel to a center axis of the stator core and have a second circumferential dimension that is smaller than the first circumferential dimension, wherein the plurality of axial openings align only with an end of one of the plurality of generally circumferentially extending slots, wherein the plurality of generally circumferentially extending slots define circumferential channel segments that provide primarily circumferential coolant flow in the stator core and the plurality of axial openings define axial channel segments that provide primarily axial coolant flow between the circumferential channel segments in the stator core.

12. The method according to claim 11 further including stamping an inlet opening at a top of the stator core in communication with the cooling channels and an outlet opening at a bottom of the stator core in communication with the cooling channels.

13. The method according to claim 11, further comprising stamping an inlet opening in a top of at least one of the annular stator laminates; and
stamping an outlet opening at a bottom of at least one of the annular stator laminates wherein the stacking includes aligning the inlet opening and the outlet opening in communication with the cooling channels.

* * * * *